(12) United States Patent
Haddad et al.

(10) Patent No.: US 7,804,756 B2
(45) Date of Patent: Sep. 28, 2010

(54) DVD−R/RW AND DVD+R/RW RECORDERS

(75) Inventors: Bassel Haddad, Haifa (IL); Jacob Finkelstein, Kfar-Saba (IL)

(73) Assignee: Zoran Corporation, Sunnyvale, CA (US)

( * ) Notice: Subject to any disclaimer, the term of this patent is extended or adjusted under 35 U.S.C. 154(b) by 545 days.

(21) Appl. No.: 11/163,237

(22) Filed: Oct. 11, 2005

(65) Prior Publication Data

US 2007/0081438 A1    Apr. 12, 2007

(51) Int. Cl.
*G11B 7/00* (2006.01)
(52) U.S. Cl. .............. 369/59.25; 369/53.34; 369/47.16; 369/47.28; 369/47.23; 369/47.31
(58) Field of Classification Search ............... 369/59.25, 369/53.34, 47.1, 47.16, 47.28, 47.23, 47.31
See application file for complete search history.

(56) References Cited

U.S. PATENT DOCUMENTS

| | | | |
|---|---|---|---|
| 4,819,121 A * | 4/1989 | Saito et al. ..................... 361/85 |
| 5,940,959 A | 8/1999 | Caveney et al. | |
| 6,183,306 B1 | 2/2001 | Caveney | |
| 6,305,950 B1 | 10/2001 | Doorhy | |
| 6,371,793 B1 | 4/2002 | Doorhy et al. | |
| 6,447,326 B1 | 9/2002 | Teach et al. | |
| 6,695,649 B1 | 2/2004 | Ciezak et al. | |
| RE38,519 E | 5/2004 | Doorhy et al. | |
| 6,738,328 B2 | 5/2004 | Koide | |
| 6,757,228 B2 * | 6/2004 | Kuroda ..................... 369/47.3 |
| 6,758,698 B1 | 7/2004 | Caveney et al. | |
| 6,799,989 B2 | 10/2004 | Doorhy et al. | |
| 7,145,858 B2 * | 12/2006 | Lee et al. .................. 369/59.19 |
| 7,245,573 B2 * | 7/2007 | Eom ........................ 369/53.34 |
| 2002/0089907 A1 | 7/2002 | De Kimpe et al. | |
| 2002/0110059 A1 | 8/2002 | Usui et al. | |
| 2002/0181362 A1 | 12/2002 | Koide | |
| 2003/0165102 A1 * | 9/2003 | Spruit et al. ............. 369/59.25 |
| 2003/0218953 A1 * | 11/2003 | Park et al. ................ 369/53.34 |
| 2004/0095861 A1 * | 5/2004 | Hsu et al. ................. 369/47.28 |
| 2004/0095863 A1 * | 5/2004 | Verboom et al. ......... 369/47.28 |
| 2004/0145982 A1 * | 7/2004 | Tsai et al. ................. 369/47.28 |
| 2004/0213119 A1 | 10/2004 | Van Vlerken et al. | |
| 2004/0240346 A1 * | 12/2004 | Yoshioka .................. 369/47.27 |
| 2006/0033580 A1 * | 2/2006 | Chen et al. .................... 331/16 |
| 2006/0126454 A1 * | 6/2006 | Serrano et al. ........... 369/44.13 |
| 2007/0097826 A1 * | 5/2007 | Iimura et al. ............. 369/53.34 |

* cited by examiner

*Primary Examiner*—Wayne R Young
*Assistant Examiner*—Linh T Nguyen
(74) *Attorney, Agent, or Firm*—Lando & Anastasi, LLP

(57) ABSTRACT

A method and apparatus for recording data at specific locations on a DVD includes selectively detecting the occurrence of wobble sync during a window computed from previous occurrences of wobble sync and eight-to-fourteen modulation sync. The method and apparatus also uses a phase-locked loop to recover the wobble signal, including wobble sync, and computes phase drift between wobble sync and eight-to-fourteen modulation sync and applies a compensation profile, compatible with a read clock phase-locked loop, to the wobble phase-locked loop.

7 Claims, 10 Drawing Sheets

DVD-R/RW AND DVD+R/RW RECORDERS

BACKGROUND

The present invention relates generally to methods and apparatus for improving the addressability, and thus the reliability with which data written to DVD-R/RW and DVD+R/RW media is recovered. Aspects of the invention relate more particularly to improving the search for the wobble sync pattern, thereby improving the bit error rate at the output of the Land Pre-Pit (LPP) or ADdress In Pre-groove (ADIP) decoder of the DVD recorder. Other aspects of the invention relate more particularly to improving the ability of the DVD recorder to accurately locate DVD user data structures relative to the predefined structures of DVD-R/RW and DVD+R/RW media provided for locating information written thereon.

There are two principal standards for recordable and rewritable DVD media that are conventionally in use today. They are referred to as DVD-R/RW and DVD+R/RW. Some relevant features of these types of media are provided here.

Information is recorded on a surface of DVD-R/RW media on a track, 100, defined by a spiral groove, 101, bounded by raised areas called lands, 102, 103. (See FIG. 1.) User information is written in the groove, 101, as a series of marks and spaces defined by regions of high and low relative reflectivity. The lands, 102, 103, that bound the grooves include features $R_1$, $R_2$, $R_3$, 104, 105, that represent certain address information and medium-related parameters, such as the power required to read and/or write the user information.

The spiral groove, 101, defined by the lands 102, 103, follows a spiral path on which is superimposed a substantially sinusoidal, radial wobble ($R_1$, $R_2$, $R_3$, for example) having a fixed frequency and amplitude along the entire track of the medium. The wobble represents position information along the track, required to use the DVD-R/RW media. Read and write clocks and disk rotation speed control may all be derived from recovered wobble information. In addition, superimposed on the wobble at predetermined, fixed locations are microscopic pits formed in the lands called Land Pre-Pits (LPPs), 104, 105. The location of frame synchronization information and other sector heading information within the user data is defined by the locations of certain predetermined sequences of LPPs, 104, 105. The significance of the predetermined sequences of LPPs when decoded and represented in binary form, referred to herein as LPP symbols, is defined by the following Table, in which the LPP symbol is comprised of three binary digits or bits identified as $b_0$, $b_1$ and $b_2$.

TABLE

| Definition | $b_2$ | $b_1$ | $b_0$ |
| --- | --- | --- | --- |
| EVEN SYNC | 1 | 1 | 1 |
| ODD SYNC | 1 | 1 | 0 |
| Pre-pit DATA ONE | 1 | 0 | 1 |
| Pre-pit DATA ZERO | 1 | 0 | 0 |

The features defining the tracks, including the lands, the grooves and the LPPs may be embossed or otherwise formed on the media together.

The relationship of LPP symbols to the structure of DVD-R/RW media is now explained. The basic structural unit by which data are represented is a channel bit duration, T. Hierarchically, the next level of structure is the frame, which includes 1,488 channel bit durations, i.e., 1,488.T. One LLP symbol is associated with each pair of frames and 26 frames comprise a DVD-R/RW sector. DVD-R/RW user data is protected by a level of redundancy provided by an error correcting code (ECC) that operates on a structure called an ECC block. Each ECC block includes 16 DVD sectors.

The wobble signal is recovered using a quadrant detector, whose outputs are then combined algebraically to produce a substantially sinusoidal wobble signal. When the head passes over an LPP, an LPP spike, also referred to as an LPP pulse, is superimposed on the substantially sinusoidal wobble signal. LPPs are located at positions selected to produce LPP pulses at peaks of the sinusoidal wobble always having the same polarity (+/−).

The presence and meaning of the sequence of LPP symbol bits is determined by detecting the locations of the spikes on the wobble signal. The predetermined sequences of bits recovered are mapped to a meaning according to the foregoing Table.

The features defining the tracks, including the lands, the grooves and the LPPs may be embossed or otherwise formed on the media together, at the time of manufacture.

The wobble signal is recovered using a four-quadrant photo detector, whose analog signal outputs are then combined algebraically by any suitable analog or digital signal processing to form the radial push-pull signal. While the head is following a track, the radial push-pull signal is the substantially sinusoidal wobble signal, 201. (See FIG. 2A.) When the head passes over an LPP, a spike, 202, is superimposed on the substantially sinusoidal wobble signal. LPPs are located at positions, 203, corresponding to peaks of the sinusoidal wobble always having the same polarity (+/−). Thus, the LPP spikes 202 are data pulses added to the underlying wobble signal 201 at particular locations.

The meaning of the sequence of LPPs is determined by detecting LPP symbols comprised of sequences of the presence or absence of the spikes on the wobble signal at particular locations, and decoding the sequence symbols into more complex meanings.

As indicated above, LPP information is embossed or otherwise prerecorded on DVD-R/RW media, other than when a user records data, for example during manufacture. The prerecorded LPP information carries various information used during subsequent recording of user data on the DVD-R/RW media. In order to successfully record user data in a manner permitting subsequent reliable recovery, the LPP spikes must be reliably detected. The amplitudes of the LPP spikes appearing on the wobble signal depend on many factors. The large number of factors which can vary the amplitudes of the LPP spikes tend to make a precise prediction of the average LPP spike amplitude difficult. Among the many factors, one important factor is significant variation in the amplitude of the quadrant photo detector signal output, especially variation in amplitude between different operating modes, such as between reading, erasing and writing operations. Laser power levels are highest during the write operation and lowest during the read operation. Due to the way DVD-RW media behaves while being erased, additional variations occur in optical pickup output as DVD-RW media traverses from the recorded to the erased state.

A conventional wobble Phase-Locked Loop (PLL) is shown in FIG. 3. The wobble PLL, 300, includes a phase detector, 301, a loop filter, 302, a voltage controlled oscillator (VCO), 303, and a wobble clock divider, 304. The output of the VCO, 303 is the write clock, 305, used to time the writing of user data. Because the write clock frequency is a multiple of the wobble signal frequency, the write clock, 305, is divided by the wobble clock divider, 304, to form the wobble clock, 306, before being compared in the phase detector, 301, to the reference wobble signal, 307, recovered from the disk. The value by which the wobble clock divider, 304, divides the write clock, 305, depends on the media type in use. For example, the wobble clock divider, 304, divides by 32 for DVD+R/RW media, while it divides by 186 for DVD–R/RW media. The phase detector, 301, produces a phase error signal, 308, which is filtered by the loop filter, 302. The filtered error signal, 309, which is produced by the loop filter, 302, controls the frequency of the write clock generated by the VCO, 303. The phase detector, 301, and the loop filter, 302, may be implemented in software, firmware or special purpose hardware, for example. In the case of the conventional wobble PLL shown, the phase detector, 301, and the loop filter, 302, are implemented as sequential logic clocked by the write clock, 305.

User data on DVD–R/RW and DVD+R/RW media is written in eight-to-fourteen modulation (EFM). Consequently, the synchronization symbol for user data is known as EFM sync. According to the DVD–R/RW standards, as shown in FIG. 4, EFM sync 401 should be written so as to be centered on the location of the LPP that when decoded represents LPP symbol bit $b_2$ 402. The LPP sync symbols 403, together with the data represented by the LPP data symbols 404, provide a robust absolute addressing method, whereby EFM frames of user data may be readily written to correct locations.

DVD+R/RW media also include tracks with a superimposed wobble, similar to the tracks of DVD–R/RW media; however, there are several important differences. DVD+R/RW media does not use LPPs to encode structural information about the media or locations along the track. Rather, predetermined portions of the track wobble are phase modulated so that the track wobble signal is correspondingly phase modulated to form so-called ADdress In Pre-groove (ADIP) information units. See FIG. 2B, which shows the modulation patterns of ADIP sync, ADIP data 1 and ADIP data 0. The ADIP unit is eight cycles of phase modulated wobble signal representing ADIP sync, ADIP data 1 and ADIP data 0. Like the LPP sync symbol in DVD–R/RW media, the location of the ADIP unit defines locations along the track. In DVD+R/RW media, as shown in FIG. 5, EFM sync 501 follows the start of the ADIP unit 502 by exactly 16 wobble signal periods.

Various kinds of defects in the media can make it more difficult to recover the synchronization information and the location information from the wobble signal on both DVD–R/RW media and DVD+R/RW media. Manufacturing defects, the use of embossing masters beyond their rated life, smudging and micro-scratches on the surface of a disk, and other defects can cause dropouts and drop-ins of the wobble signal. Dropouts and drop-ins, which are abnormally low amplitude or abnormally high amplitude regions in the wobble signal, can result in phase errors when the reference wobble signal is compared to the recovered wobble clock. Moreover, dropouts and drop-ins can cause missing, phantom or garbled sync information to be recovered from the wobble signal, whether that information is represented by LPP symbols superimposed on the wobble signal or whether that information is represented by ADIP phase modulated regions of the wobble signal.

One example of a system and method for better matching the write clock of a DVD recorder to information already present on the DVD to be recorded is disclosed by Kuroda in United States Patent Application Publication US2003/0039186 A1. Kuroda discloses resynchronizing write and read operations after data recording has been stopped and then restarted. Kuroda is concerned with seamlessly restarting the write process after a block has been written and the write process terminated. Notably, Kuroda does not solve or even address the problem of dropouts or dropins in the wobble signal recovered from a defective region of a DVD.

SUMMARY

According to aspects of embodiments of the present invention, the writing quality of DVD recorders using both DVD–R/RW and DVD+R/RW media can be improved by improving error rates at the LPP or ADIP decoder outputs, respectively. The improvement may arise from at least three aspects of embodiments of the invention that may be arranged to act in concert. Namely, the signal to noise (S/N) ratio during wobble sync signal detection is improved; phase drift, for example, due to defects in the wobble signal, is substantially avoided, thus preventing writing EFM frames to incorrect locations; and, compensation for phase drift that does occur is performed in a controllable manner that does not compromise read channel circuit data extraction quality when reading or playing back the user data.

Among the benefits of using aspects of the present invention in DVD recorder units is that both DVD–R/RW media and DVD+R/RW media used in such DVD recorder units incorporating aspects of the invention will play back recorded information with fewer errors, such as fewer clicks, fewer pops, and fewer content interruptions for example. A further benefit is that media recorded by such DVD recorder units incorporating aspects of the invention will play back properly in a greater percentage of DVD playback devices, including low cost units. Yet a further benefit is that such DVD recorder units incorporating aspects of the invention will record so as to be able to provide good results even when inexpensive, lower quality DVD–R/RW and DVD+R/RW media are used. In addition to manufacturing defects, multiples rewrites of rewritable media also harms the wobble, for example, when writing with non-optimal power.

One important result of using aspects of embodiments of the present invention is that writing processes need not be stopped under some circumstances where stopping would otherwise be required in a conventional system. Writing to DVD media may be stopped for many reasons, including some that are not addressed by the present invention; however, aspects of the invention address unintended stopping due to loss of synchronization between the data channel and the wobble channel. The data channel is the channel through which write data is written to a disk. The wobble channel is the channel through which absolute physical positions on the disk are determined. In order for user data written to a disk to be readable, the address information written with the user data, for example in a header, should match the physical location on the disk where the user data is written. Unintended stopping due to loss of synchronization may be avoided by application of aspects of embodiments of the invention because the wobble symbol that identifies the proper starting locations for data frames is more readily found and because any phase error accumulated between the data channel and the wobble channel is substantially continuously and gradually dissipated by a compensating phase adjustment to the wobble clock recovery system, which derives the write clock from the recovered wobble signal.

Aspects of the present invention provide for methods and apparatus that gradually adjust the timing between the wobble symbol signal and the EFM sync to compensate for and eliminate timing errors introduced by drift.

Each physical address marked by wobble symbols signals is more accurately detected by basing each detection on the prior series of successful detections. In the absence of substantial drift, according to aspects of the present invention, detection of wobble symbols can be gated so that wobble symbols are detected only in locations at which EFM data should be written. Channel delays are reduced as follows. The wobble signal is extracted from the disk to produce the write clock and timing with which EFM data is written to the disk. Delays in processing the wobble signal would cause EFM data to be written to incorrect locations. To start writing at address N, the wobble symbols identifying address N-1 are sought, and then the location of the next expected EFM sync location is computed. The computation may be predetermined using simulation or off-line measurement of actual systems. The detection, computation and gating aspects of the invention enable this functionality.

When a defect in the wobble signal occurs that prevents accurate detection by the wobble PLL of the wobble signal phase, aspects of the invention provide for the substitution of a corrective profile signal on an open loop basis for the closed loop, detected (defective) phase error signal. The result of the open loop compensation is observed by monitoring the timing of EFM sync relative to where wobble symbols occur or are predicted to occur, and a further open loop compensation profile may be applied or closed loop operation resumed. If the phase error of the wobble PLL becomes larger than one cycle, this aspect of the invention can bring the exemplary wobble PLL back within its usual, one cycle operating range. Other PLLs may have other phase error operating ranges.

According to aspects of one embodiment of the invention, a method of operating a DVD reader/recorder including a wobble channel and a data channel in a DVD recorder, comprises: monitoring locations of data channel sync patterns relative to wobble channel symbols having a known spacing; computing a phase drift between data channel sync patterns and wobble channel symbols; and adjusting DVD reader/recorder operation to compensate for the phase drift computed. Several variations are possible. For example, adjusting may be performed substantially continuously. The method may further comprise: tracking wobble channel symbol phase with a wobble phase locked loop (PLL) operating as a closed loop; and overriding closed loop operation of the PLL to perform the adjusting to compensate for the phase drift. According to another variation, the method may also further comprise: tracking wobble channel symbol phase with a wobble phase locked loop (PLL) operating as a closed loop; and adding to the closed loop a compensation signal derived externally to the closed loop to compensate for the phase drift. According to yet another variation, the method may further comprise: establishing a detection window around the time at which a wobble channel sync pattern is expected by combining the known spacing with the computed phase drift.

According to another aspect of an embodiment of the invention, a method of operating a DVD reader/recorder including a wobble channel and a data channel in a DVD recorder, comprises: recovering wobble channel symbols from a DVD using a wobble PLL; monitoring locations of data channel sync patterns relative to wobble channel symbols; computing a phase drift between data channel sync patterns and wobble channel symbols; and deriving from the computed phase drift a compensation profile applied to the wobble PLL. The method according to this aspect may further comprise: writing user data using a write clock derived from the wobble PLL; recovering user data from the DVD using a read data PLL; and deriving further comprises constructing a compensation profile that when tracked by the wobble PLL keeps phase changes to the user data written within a range recoverable by the read data PLL.

According to yet another aspect of an embodiment of the invention, a method of operating a DVD reader/recorder including a wobble channel and a data channel in a DVD recorder, comprises: recovering wobble channel symbols having a known spacing from a DVD medium using a wobble PLL; recovering data channel sync patterns from the DVD medium; monitoring locations of data channel sync patterns relative to the wobble channel symbols; determining a phase drift between the data channel sync patterns and the wobble channel symbols; and writing data to the DVD medium based upon the determined phase drift when the wobble channel symbols cannot be recovered. In a variation, the method may further comprise determining where to begin writing data to the DVD by combining the determined phase drift and a location at which a recent data channel sync pattern has been recovered.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
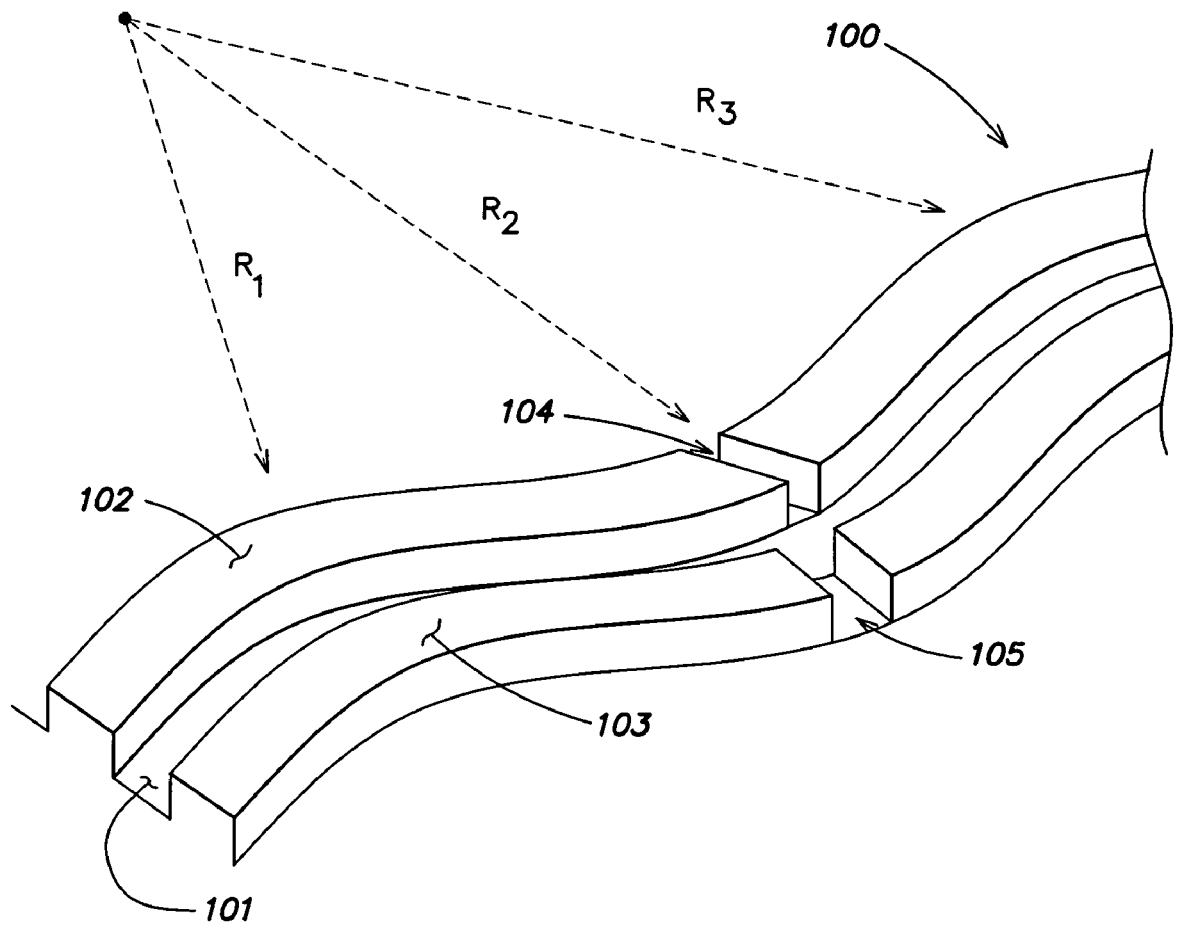
FIG. 1 is a perspective cross-sectional view of a DVD-R/RW track including a wobble and Land Pre-Pits (LPPs)
Figure 2A:
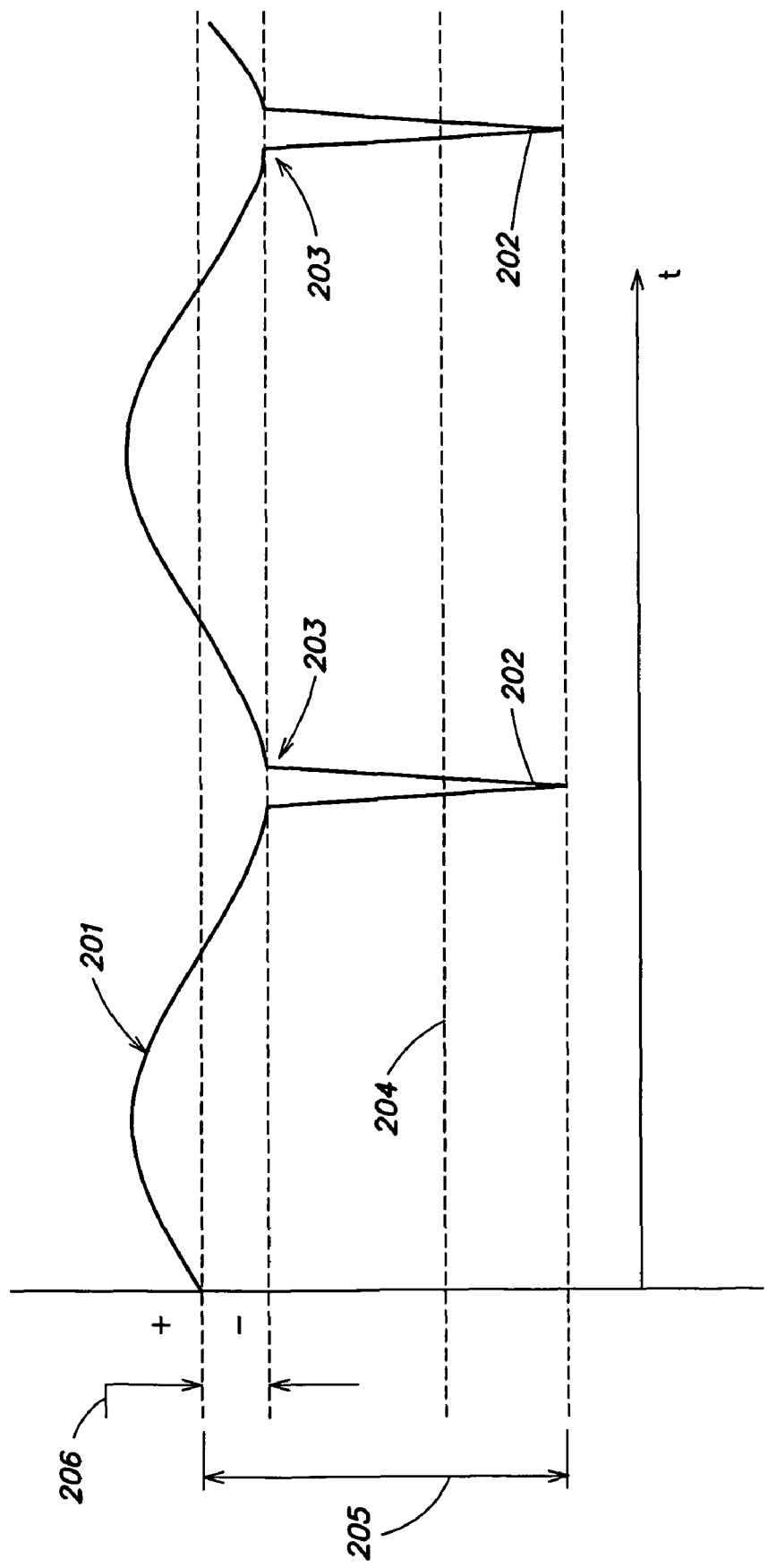
FIG. 2A is a waveform graph of a wobble signal showing the characteristic appearance when LPPs are encountered.
Figure 2B:
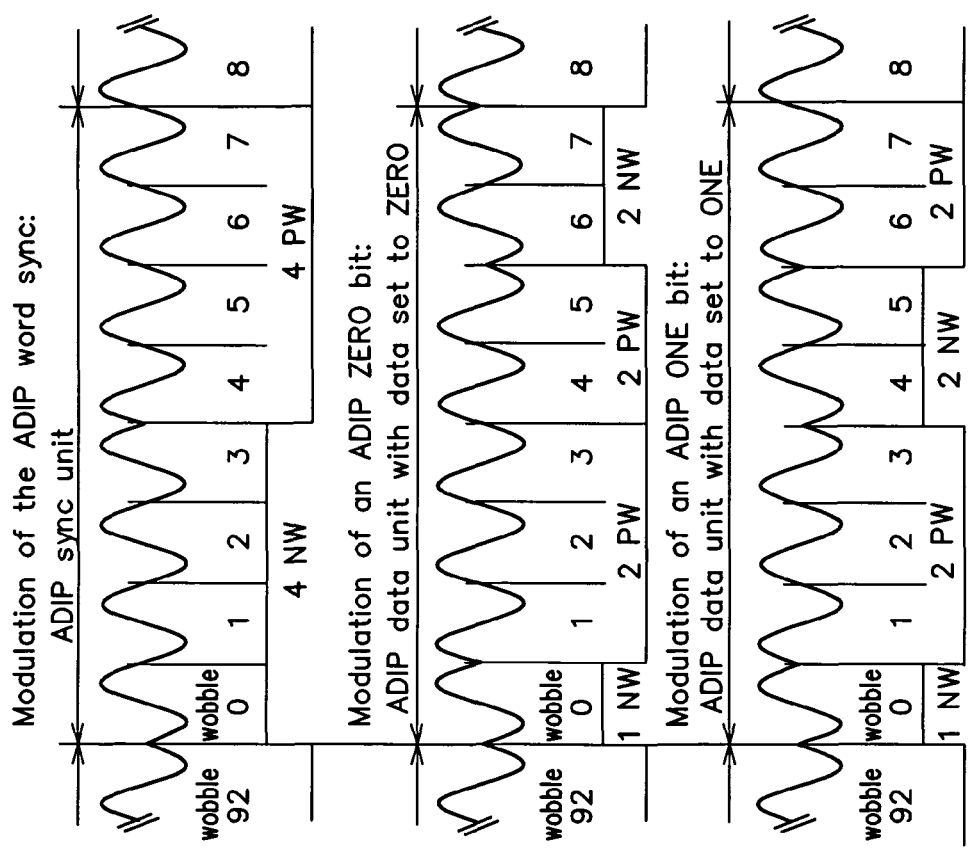
FIG. 2B is a signal timing diagram of a wobble signal recovered from a DVD+R/RW track including a wobble and ADdress In Pre-groove (ADIP) modulation.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Embodiments of aspects of present invention improve the accuracy with which address information is recovered by the LPP decoder or the ADIP decoder of DVD-R/RW or DVD+R/RW recorders, respectively, by gating the search for the wobble sync pattern by a window determined from past performance, measuring the phase drift between the EFM sync pattern and the wobble symbols, and initiating a compensation mechanism in the wobble recovery circuits, for example, in the wobble PLL. Setting up of the window for detecting wobble symbols and compensating for phase drift may both depend on a measurement of phase drift between the wobble symbols and the locations at which EFM sync patterns are actually written, but may be incorporated in embodiments of the invention either independently or together so as to act in concert.

As explained above, in both DVD media formats commonly in use today, the wobble symbols have a fixed relative relationship to the EFM sync patterns in the data frames. In DVD−R/RW media, as the wobble symbols are recovered and the EFM signal is encoded, the EFM sync pattern and the LPP symbols are aligned in time, with the middle of the EFM sync correlated to the LPP symbol bit $b_2$. In DVD+R/RW media, as the wobble symbol is recovered and the EFM signal is encoded, there is a 16-wobble-period shift between the start of the wobble ADIP unit and the start of the EFM sync.

Embodiments of aspects of the present invention use the identified correlation to improve the proper decoding of physical addresses for either format media during write operations. This is done by computing the time of, and establishing a window around, the expected location of the wobble symbol during which the search for the wobble symbol is gated on and outside of which the search for the wobble symbol is gated off. As used herein, wobble symbol refers to either the LPP symbol or the ADIP unit. Gating on and off of wobble symbol detection may be performed by gating the wobble symbol detector output, for example, or by any other suitable means.

The precise time from one wobble sync to the next in units of wobble signal cycles is known, because that spacing is defined by the standards for DVD−R/RW and DVD+R/RW media. If the wobble signal were always reliable at the input to the wobble PLL, then a counter could simply count cycles from one wobble sync symbol until the next wobble sync symbol. However, the wobble signal may sometimes not be adequately detected as a result of defects on the media. When this happens, in the absence of a reliable wobble signal input, the wobble PLL can begin to drift from the correct wobble frequency. In a conventional PLL system, the wobble clock may, for example, continue to be produced based upon the last measurable signal (e.g., prior to the defect), but it may accumulate some phase error due to drift, for example due to servo behavior during a defect. Thus, it is desired to set up a window during which to look for wobble sync that is at least partly independent of the recovery of the wobble clock.

A suitable window can readily be calculated whose start point and end point bracket the expected location of the next wobble sync in a continuous wobble signal stream, while spanning a sufficient period of time to allow detection of wobble sync symbols in the presence of a predetermined amount of phase drift. The window location is computed based on the number of wobble clock cycles expected between wobble sync symbols absent any phase drift. Moreover, when-encoded EFM sync symbols do not properly align with recovered wobble sync symbols, i.e. exhibit some phase drift between the wobble signal and the user data, for example as a result of imperfect recovery of a wobble signal from a defective region of a disk, the amount of drift can be added to (or subtracted from) the next computed window location so as to more accurately find the wobble sync based on a previous EFM sync signal in combination with the recovered, but drifted, wobble clock.

By continuously monitoring the timing of each EFM sync symbol relative each recovered wobble symbol, data written to incorrect locations on the disk can be minimized or avoided. The difference between the actual point in time, i.e. phase, at which EFM sync is located and the point in time, i.e. phase, at which the recovered wobble symbols are located, compared to the expected difference noted above, defines the total accumulated phase drift at that point in the EFM data stream. The measured accumulated phase drift is applied to a circuit for generating a compensation profile which is then selectively applied to the wobble PLL circuit. The compensation profile may take into account the magnitude of the measured phase drift, along with the reasonably expected bandwidth of the data recovery PLL circuit in the read channel of a DVD playback unit. For example, based upon the measured bandwidth of the data recovery PLL circuit in a number of different DVD players or players/recorders from different manufactures, the compensation profile can be determined and spread over a period of time such that the phase correction at any point in time is small enough to permit the data recovery PLL to follow the change. Alternatively, the design bandwidth of the data recovery PLL circuit of the DVD player/recorder in which the present invention is embodied, or any other suitable bandwidth, may be selected as the bandwidth accommodated by the compensation profile.

Figure 3:
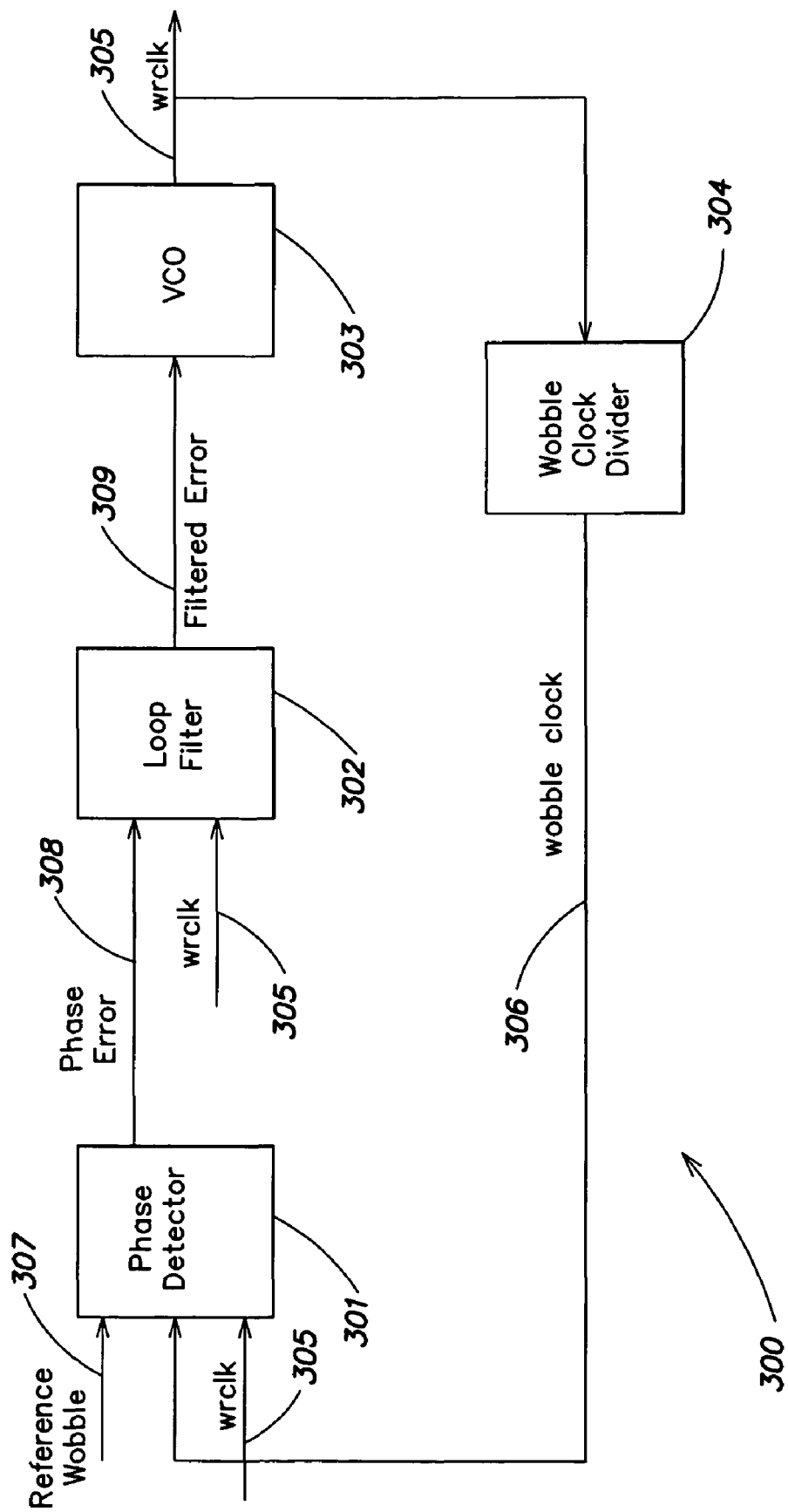
FIG. 3 is a schematic block diagram of a conventional wobble Phase-Locked Loop (PLL)
Figure 4:
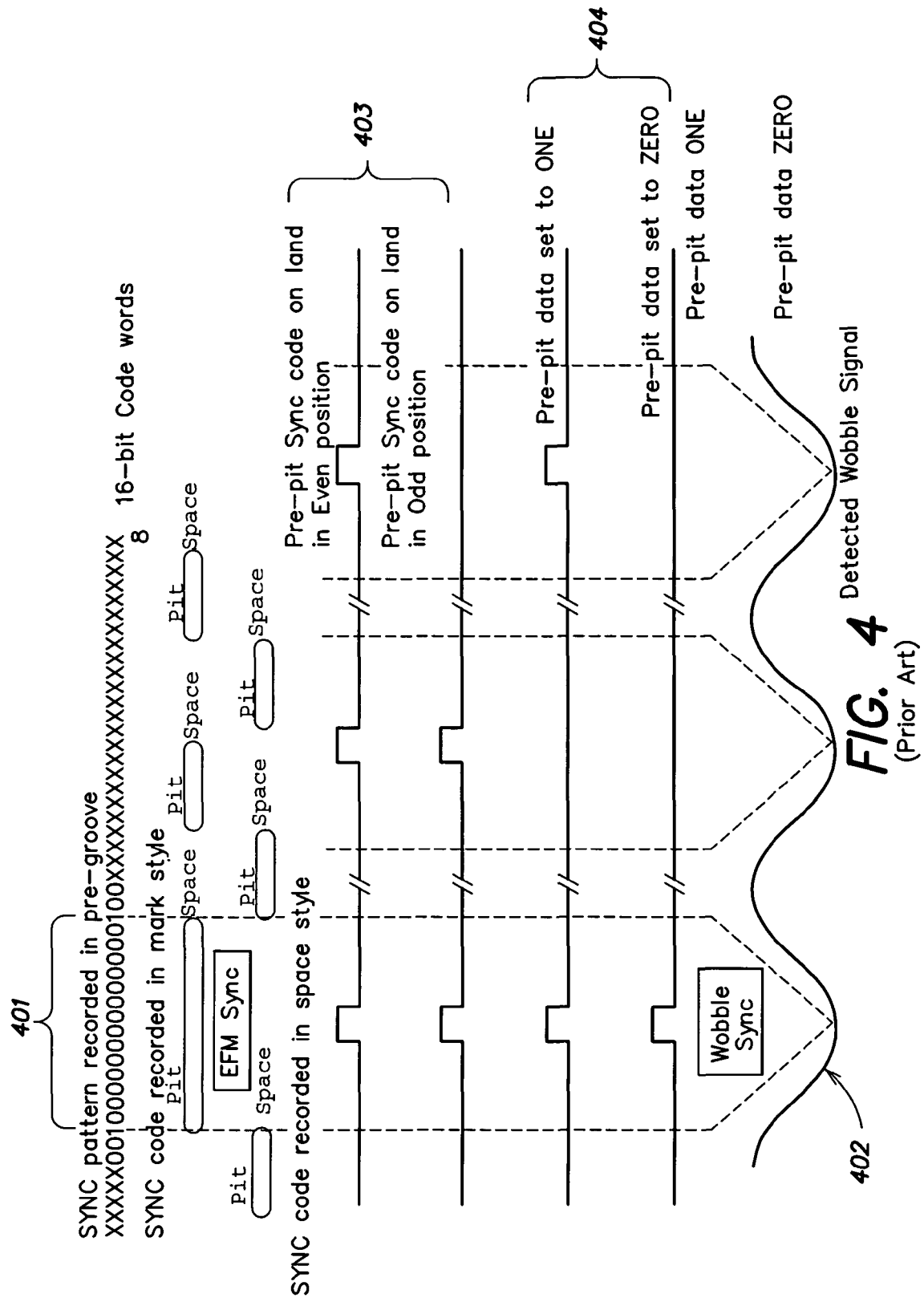
FIG. 4 is a signal timing diagram showing the relationship between the wobble sync signal and the Eight-to-Fourteen Modulation (EFM) sync signal for DVD-R/RW media.
Figure 5:
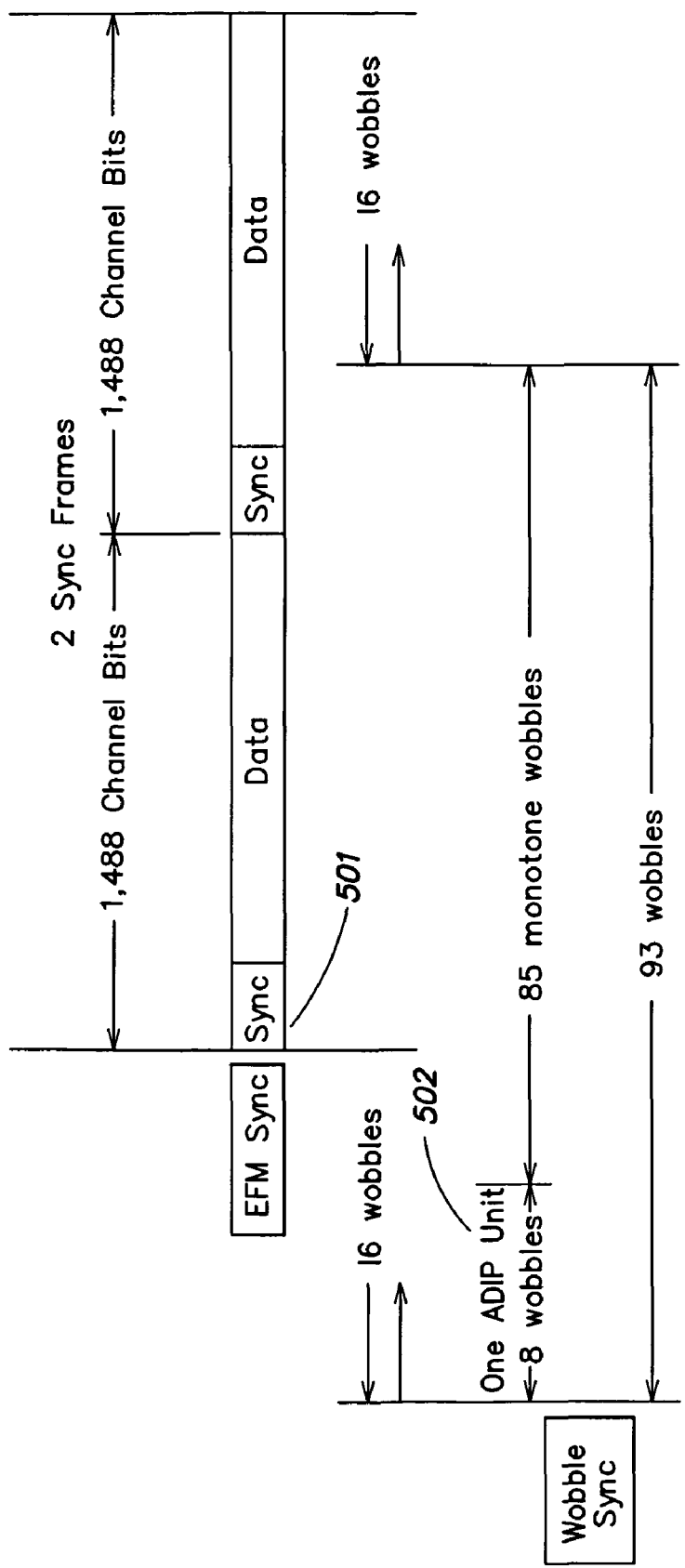
FIG. 5 is a signal timing diagram showing the relationship between the wobble sync signal and the EFM sync signal for DVD+R/RW media.

Operation of the previously described aspects of embodiments of the invention in concert is now described. During a write operation to a defective region of a disk, the reference wobble signal recovered from the disk may have few reliable zero crossings because zero crossings may be moved, missing, or extra, resulting in unreliable information, or detected zero crossings may be randomly spaced apart, and as a result, no reliable phase-error signal is produced by the wobble PLL phase detector (FIG. 3, 301). According to aspects of an embodiment of the present invention, the phase drift between the wobble signal and the EFM data is continuously monitored separately from the phase measured by the wobble PLL phase detector, by comparing the time at which each wobble symbol is detected to the time at which EFM sync is generated, as described above. When phase drift is detected, the detection window for the next wobble symbol is suitably shifted. In addition, the wobble PLL compensates for the measured phase drift by substituting a compensation phase error profile for the phase error signal ordinarily communicated to the VCO. The applied compensation phase error adjusts the wobble PLL frequency and phase over a period of time. The rate at which the wobble PLL frequency and phase is adjusted is determined from the measured phase drift and the anticipated or assumed characteristics of the data recovery PLL. The phase compensation magnitude applied is chosen to be small enough to ensure that there will be no substantial glitches in the write clock and thus that the data recovery PLL in the read channel can follow the phase of the written data without introducing errors.

In short, embodiments of this aspect of the invention substantially continuously monitor wobble symbol location and its relationship to EFM sync when both are available. When, for example, the wobble symbol is not adequately detected due to a drop-in or dropout, the time at which wobble symbol should have been detected is estimated. The next search for wobble symbol is based on this estimate. If the phase drift exceeds a threshold value, then the compensation profile applied to the wobble PLL, which generates the write timing will start pulling the phase back into alignment as the recorder writes subsequent data. By knowing what the phase difference due to drift is, data is written as close as possible to where it should be written and gradually brought back to the correct phase relative to the reference wobble signal.

The threshold can be selected as a number of channel bit durations, in consideration of several factors. For example, the characteristics of the wobble PLL are relevant. The phase detectors of some wobble PLLs have outputs which saturate for phase errors larger than one wobble cycle or have outputs which disregard any integer number of wobble cycles by which an error reaches or exceeds one wobble cycle. In such cases, the threshold could be set to a number of channel bit durations at or above the length of one wobble cycle. Other time references than channel bit durations, and other phase measurements could be employed, if desired by the skilled designer.

Figure 8:
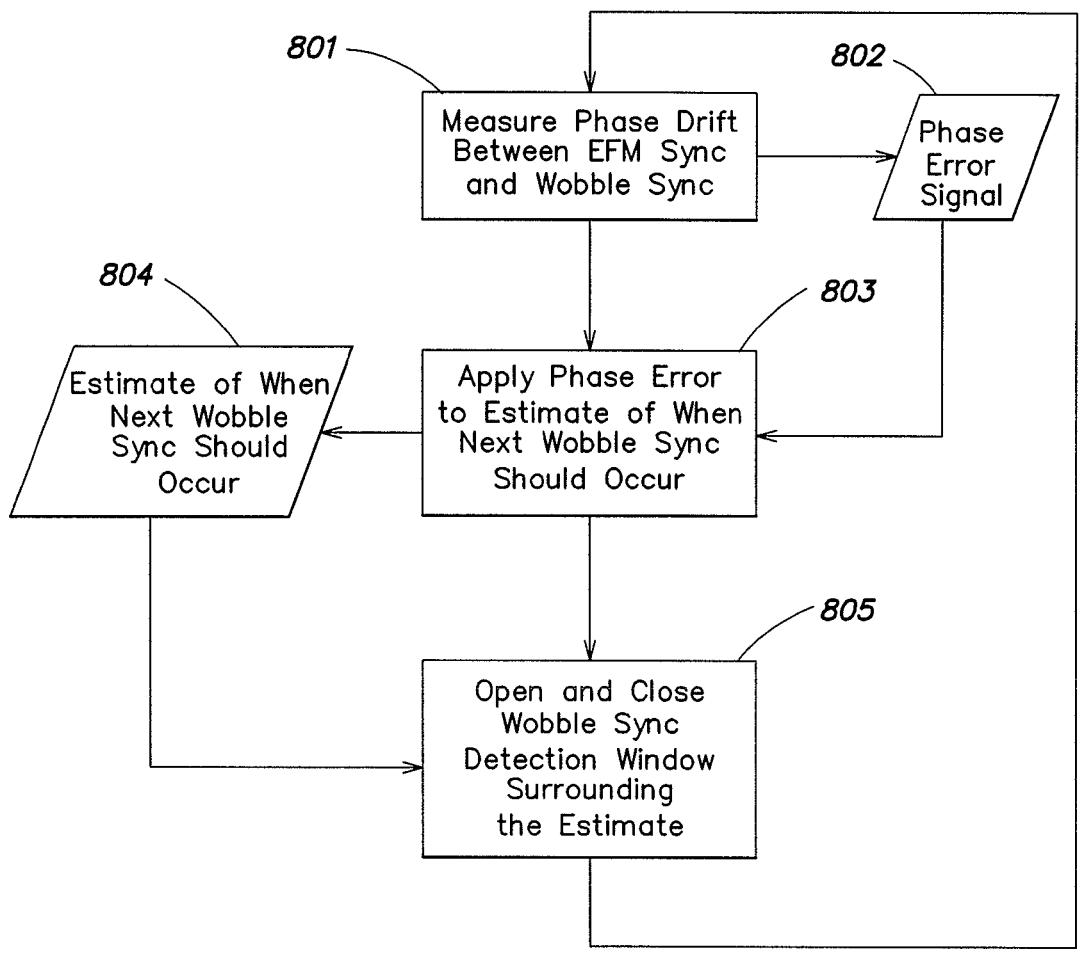
FIG. 8 is a process flow diagram showing a process for detecting wobble sync.

The process for setting a wobble sync detection window is shown in FIG. 8. As has been described above, the process includes three basic acts. First, phase drift between each wobble symbol and each corresponding EFM sync symbol is measured, 801, on a substantially continuous, ongoing basis. The result of this measurement is a phase error signal, 802, which may be represented as a physical voltage or current, or may be represented as a numeric symbol in a digitally-implemented embodiment. The phase error is applied (either added to or subtracted from), 803, the time in wobble signal periods nominally between wobble symbols, to determine a time, 804, at which the next wobble symbol is expected. Finally, the detection window is opened, or enabled, from a suitable time before the time at which the next wobble symbol is expected to a suitable time after the time at which the next wobble symbol is expected, 805. The suitable times are selected to accommodate a predicted amount of phase variation expected in the system due to response times, time constants and other parameters of the circuits making up the system.

Figure 7:
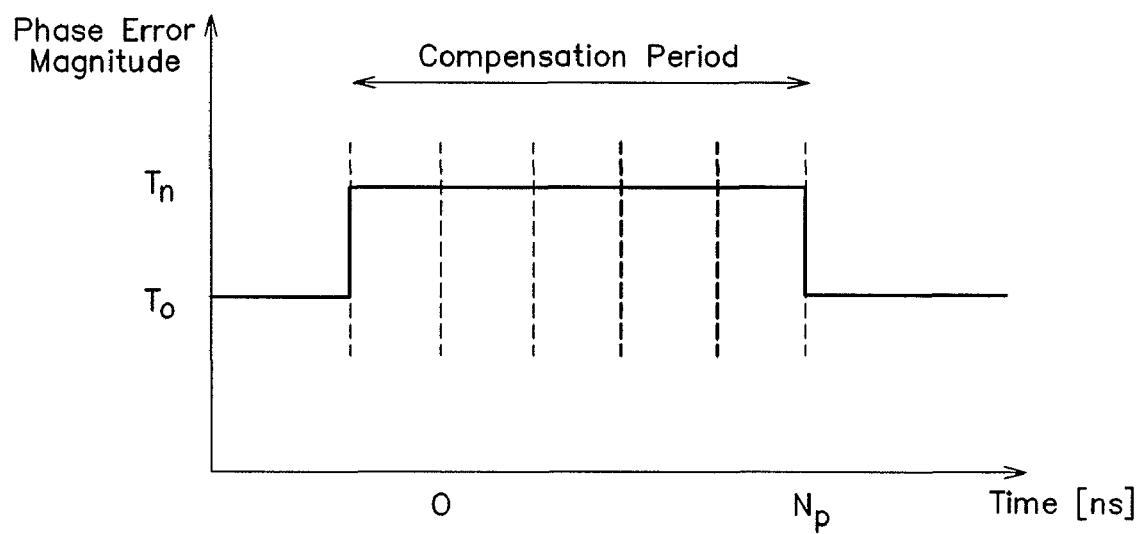
FIG. 7 is a signal timing diagram of a compensation profile according to aspects of embodiments of the present invention.
Figure 9:
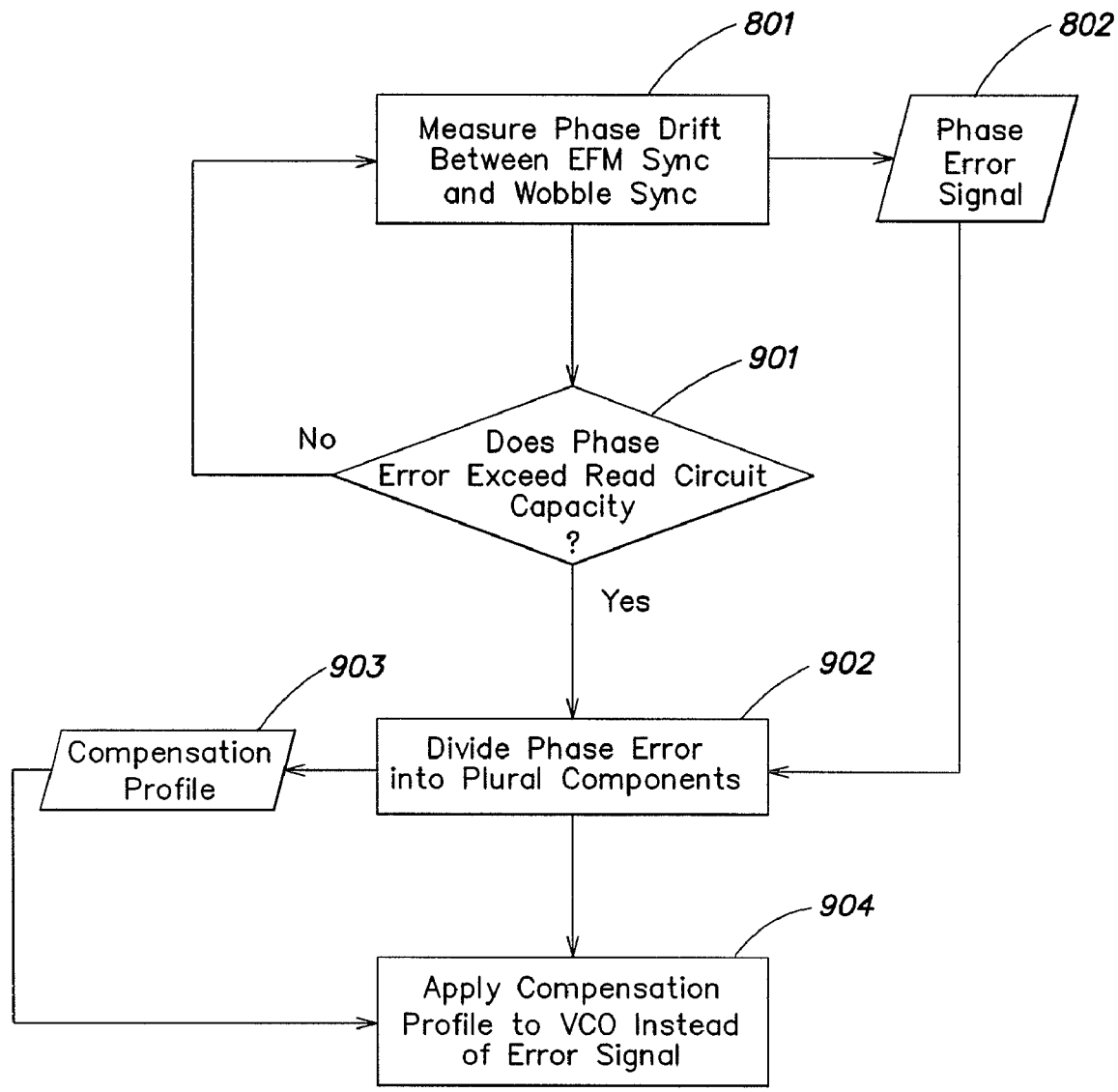
FIG. 9 is a process flow diagram showing a process for compensating for wobble sync drift relative to EFM sync.

The process for compensating for phase drift is shown in FIG. 9. In this process, as in the process of FIG. 8, phase drift between each wobble symbol and each corresponding EFM sync symbol is measured, 801, on a substantially continuous, ongoing basis. A phase error signal, 802, is thus developed. If the phase error, 802, exceeds a threshold value, then a phase compensation profile (See FIG. 7) is created, for example by dividing, 902, the phase error (in the example of FIG. 7, $N_p \cdot T_n$) into several equal-magnitude components (in the example of FIG. 7, $T_n$) defining a compensation profile, 903, to be applied over several correction cycles. Preferably the size of the equal-magnitude components is selected so that the read circuits of various DVD recorders/players can track phase changes of the magnitude of the equal-magnitude components. Of course, the invention is not limited to profiles employing equal-magnitude components, the phase error can be divided into components of any convenient size and relationship that can be followed by the read circuits of various DVD players. A signal is then selectively applied, 904, to the wobble PLL, moving the VCO frequency towards the correct frequency by that fraction represented by the component of the phase error applied. The signal selectively applied is an artificially-created error signal that replaces the actual error signal. The magnitude of the artificially-created error signal is computed according to the desired degree of correction to be applied during one correction cycle and the VCO frequency and phase prior to applying the phase compensation profile. The artificially-created error signal may further depend on the specific wobble PLL performance characteristics.

Figure 6:
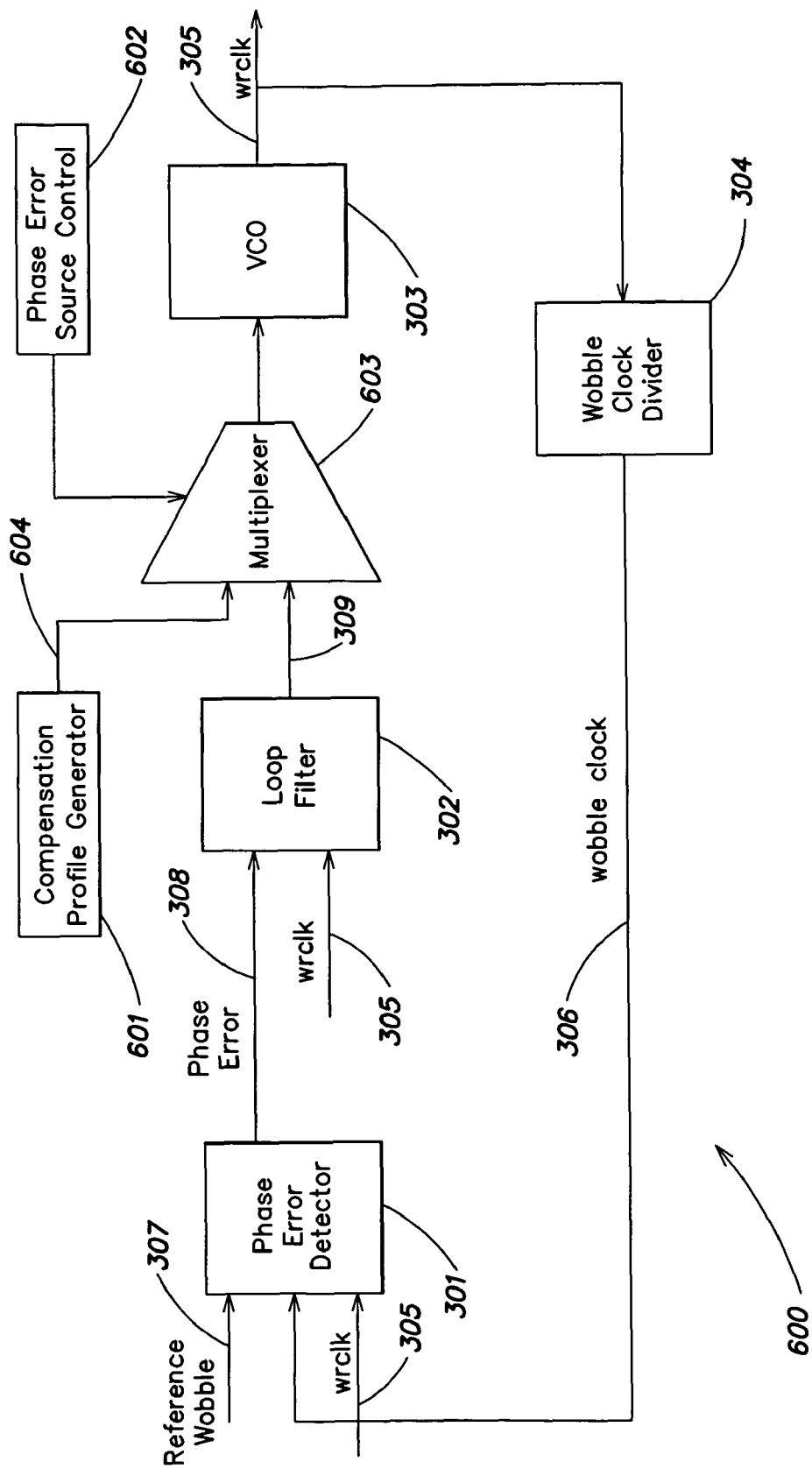
FIG. 6 is a schematic block diagram of a wobble PLL incorporating aspects of embodiments of the invention.

The process of FIG. 9 may be carried out by a system as shown in FIG. 6, for example. The wobble PLL, 600, of FIG. 6 includes a phase detector, 301, a loop filter, 302, a VCO, 303, and a divider 304, as included in a conventional wobble PLL (See FIG. 3). To these components are added a compensation profile generator, 601, a phase error source control, 602, and a multiplexer, 603. When the phase error reaches a threshold, or at any such other time as may be desired, the phase error source control, 602, switches the PLL from responding to the error signal 309 to responding to a compensation profile 604 created by the compensation profile generator, 601, by switching multiplexer, 603. Compensation profile generator, 601, computes a compensation profile from the phase drift and knowledge or assumptions regarding the read system, as described above.

According to one variation of aspects of the invention, the measurement of the drift between wobble symbol timing and EFM sync timing can be used to calibrate the wobble PLL bandwidth. In order to ensure correct writing, it is desired to keep the relationship between wobble symbol timing and EFM sync timing constant. The write clock used to time the writing of EFM data, including EFM sync, is derived from the wobble PLL output. The PLL bandwidth can be controlled by a closed loop control having a control output derived from the measurement of the drift. By controlling the wobble PLL bandwidth this way, the wobble PLL, and consequently the write clock as well, take into account servo performance, noise in the spindle speed control, etc. that affect timing between the wobble signal and the EFM sync.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of operating a digital versatile disk (DVD) reader/recorder including a wobble channel carrying wobble channel symbols recovered from a DVD and a data channel carrying data channel sync patterns recovered from the DVD in a DVD recorder, comprising:

deriving a write clock from the recovered wobble channel symbols;

monitoring time-varying time intervals from when the data channel sync patterns carried in the data channel are recovered to when the wobble channel symbols carried in the wobble channel are recovered;

computing a window of time during which a next wobble symbol is expected;

computing a phase drift between data channel sync patterns and wobble channel symbols based on the monitored time-varying time differences;

adjusting the computed window by the phase drift computed;

searching for the next wobble symbol during the adjusted, computed window;

adjusting the derived write clock to compensate for the phase drift computed;

tracking wobble channel signal phase with a wobble phase locked loop (PLL) having a control signal derived from the wobble channel input phase and operating as a closed loop independent of the data channel; and overriding closed loop operation of the PLL by modifying the control signal of the PLL from its derivation from the wobble channel signal phase to perform the adjusting to compensate for the phase drift.

2. The method of claim 1, wherein adjusting is performed substantially continuously.

3. The method of claim 1, further comprising:

adding to the closed loop during overriding a compensation signal derived externally to the closed loop to compensate for the phase drift.

4. A method of operating a digital versatile disk (DVD) recorder to record on a DVD medium including a wobble channel and a data channel, comprising:
- recovering wobble channel symbols from the DVD medium using a wobble PLL having a control signal representative of a wobble channel symbol phase;
- recovering data channel sync patterns from the DVD medium;
- monitoring time-varying time intervals from when the data channel sync patterns are recovered to when the wobble channel symbols are recovered;
- computing a window of time during which a next wobble symbol is expected;
- computing a phase drift between data channel sync patterns and wobble channel symbols based on the monitored time-varying time differences;
- adjusting the computed window by the phase drift computed;
- searching for the next wobble symbol during the adjusted, computed window;
- deriving from the computed phase drift a time-varying compensation profile independent of the wobble channel symbol phase applied to the control signal of the wobble PLL,
- tracking wobble channel signal phase with a wobble phase locked loop (PLL) having a control signal derived from the wobble channel input phase and operating as a closed loop independent of the data channel; and
- overriding closed loop operation of the PLL by modifying the control signal of the PLL from its derivation from the wobble channel signal phase to perform the adjusting to compensate for the phase drift.

5. The method of claim 4, further comprising:
- writing user write data using a write clock derived from the wobble PLL;
- recovering user written data from the DVD medium using a read data PLL; and
- deriving further comprises constructing the time-varying compensation profile such that when applied, the wobble PLL keeps phase differences between the user write data and the user written data within a range recoverable by the read data PLL.

6. A method of operating a digital versatile disk (DVD) reader/recorder to record on a DVD medium including a wobble channel and a data channel, comprising:
- recovering wobble channel symbols having a known spacing from the DVD medium using a wobble PLL;
- recovering data channel sync patterns from the DVD medium;
- generating data channel sync patterns for writing to the DVD medium;
- monitoring time-varying time intervals from when the data channel sync patterns are recovered to when the wobble channel symbols are recovered;
- computing a window of time during which a next wobble symbol is expected;
- determining a phase drift between the data channel sync patterns and the wobble channel symbols based on the monitored time-varying time differences;
- adjusting the computed window by the phase drift determined;
- searching for the next wobble symbol during the adjusted, computed window; and
- writing data to the DVD medium at times derived from the wobble channel symbols as adjusted based upon the determined phase drift;
- tracking wobble channel signal phase with a wobble phase locked loop (PLL) having a control signal derived from the wobble channel input phase and operating as a closed loop independent of the data channel; and
- overriding closed loop operation of the PLL by modifying the control signal of the PLL from its derivation from the wobble channel signal phase to perform the adjusting to compensate for the phase drift.

7. The method of claim 6, further comprising:
- determining where to write data to the DVD medium by combining the determined phase drift and a location at which a recent data channel sync pattern has been generated.

* * * * *